(12) United States Patent
Nakamura et al.

(10) Patent No.: US 6,429,556 B1
(45) Date of Patent: Aug. 6, 2002

(54) AC GENERATOR FOR VEHICLE

(75) Inventors: Shigenobu Nakamura, Anjo; Kenzo Mitani, Obu; Tsutomu Shiga, Nukata-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/570,534

(22) Filed: May 12, 2000

(30) Foreign Application Priority Data

Jun. 1, 1999 (JP) .............................................. 11-153929

(51) Int. Cl.[7] .................................................. H02K 11/00
(52) U.S. Cl. ........................................ 310/71; 310/68 D
(58) Field of Search .......................... 310/71, 688, 263; 363/142, 144, 146

(56) References Cited

U.S. PATENT DOCUMENTS

| | | | | |
|---|---|---|---|---|
| 4,604,538 A | * | 8/1986 | Merrill et al. ............ | 310/68 D |
| 5,331,231 A | * | 7/1994 | Koplin et al. ............. | 310/68 D |
| 5,451,823 A | * | 9/1995 | Deverall et al. .......... | 310/68 D |
| 5,576,584 A | * | 11/1996 | Kusumoto et al. ........... | 310/45 |
| 5,659,212 A | * | 8/1997 | DePetris ................... | 310/68 D |
| 5,682,070 A | | 10/1997 | Adachi et al. ................ | 310/71 |
| 5,710,467 A | * | 1/1998 | Irie et al. ....................... | 310/64 |
| 5,998,903 A | * | 12/1999 | Umeda et al. .............. | 310/179 |
| 6,160,335 A | * | 12/2000 | Ishida et al. .............. | 310/68 D |

* cited by examiner

Primary Examiner—Nestor Ramirez
Assistant Examiner—Dang Dinh Le
(74) Attorney, Agent, or Firm—Oliff & Berridge, PLC (57) ABSTRACT

An AC generator for a vehicle includes a plurality of output lead wires having a generally rectangular cross-section with longer sides being parallel to a radial direction of the rotor and a rectifier unit having a pair of positive and negative metal heat sinks with a plurality of pairs of a positive rectifier element welded to the heat sinks and a terminal member. The terminal member has a plurality of metal terminals for connecting the rectifier elements so as to provide a structure for provisionally holding the rectifier unit only by the lead wires.

2 Claims, 12 Drawing Sheets

AC GENERATOR FOR VEHICLE

CROSS REFERENCE TO RELATED APPLICATION

The present application is based on and claims priority from Japanese Patent Application Hei 11-153929 filed Jun. 1, 1999, the contents of which are incorporated herein by reference.

BACKGROUND OF THE INVENTION

1. Field of the Invention

The present invention relates to an AC generator for a vehicle, and particularly to a rectifier arrangement of an AC generator.

2. Description of the-Related Art

As disclosed in JP-A-9-19119, a rectifier unit is comprised of a plurality of pairs of positive and negative diodes which are respectively welded to positive and negative heat sinks, a circuit board having a plurality of insert terminals to which output lead wires extend to be welded thereto, a terminal member having a plurality of metal terminals which connect the diodes to form a rectifying bridge circuit, an insulator disposed between the heat sinks, and a DC output terminal. The output lead wires have a round cross section, and the heat sinks are made of aluminum-based alloy.

The circuit board is fixed by screws to connect the metal terminal of the terminal member to the insert terminal of the circuit board.

Thus, two connection steps, a step of connecting the output lead wires and the circuit board and a step of fixing the circuit board to the terminal member, are necessary to connect the output lead wires and the diodes. Since the output lead wire has a round cross section, it is difficult to support the rectifier unit by itself during the manufacturing steps. This necessitates additional supporting steps or tools.

SUMMARY OF THE INVENTION

A main object of the invention is to provide an inexpensive and easy-manufactured AC generator for a vehicle.

In the AC generator according to a main feature of the invention, lead wires of a stator winding have a generally rectangular cross section with longer sides extending in parallel to a radial direction of said rotor, and a terminal member of a rectifier unit has a plurality of metal terminals for connecting rectifier elements to provide a structure for provisionally holding the rectifier unit only by said lead wires.

The metal terminals are preferably disposed at circumference of heat sinks of the rectifier unit in an arc range θ that is larger than 180°. The terminal member may include a plurality of resin guide members having axially extending rectangular holes at the outer peripheral portion of the heat sink to guide the lead wires therein, and the metal terminals may include U-shaped terminal portions respectively disposed at the plurality of guide members to connect the lead wires.

The heat sinks may include a pair of arc-shaped aluminum alloy members having a plurality of recesses at circumference of heat sinks, and the metal terminals comprise U-shaped terminal portions respectively disposed in the plurality of recesses.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

An AC generator for a vehicle according to a first embodiment of the invention is described with reference to FIGS. 1–7.

Figure 1:
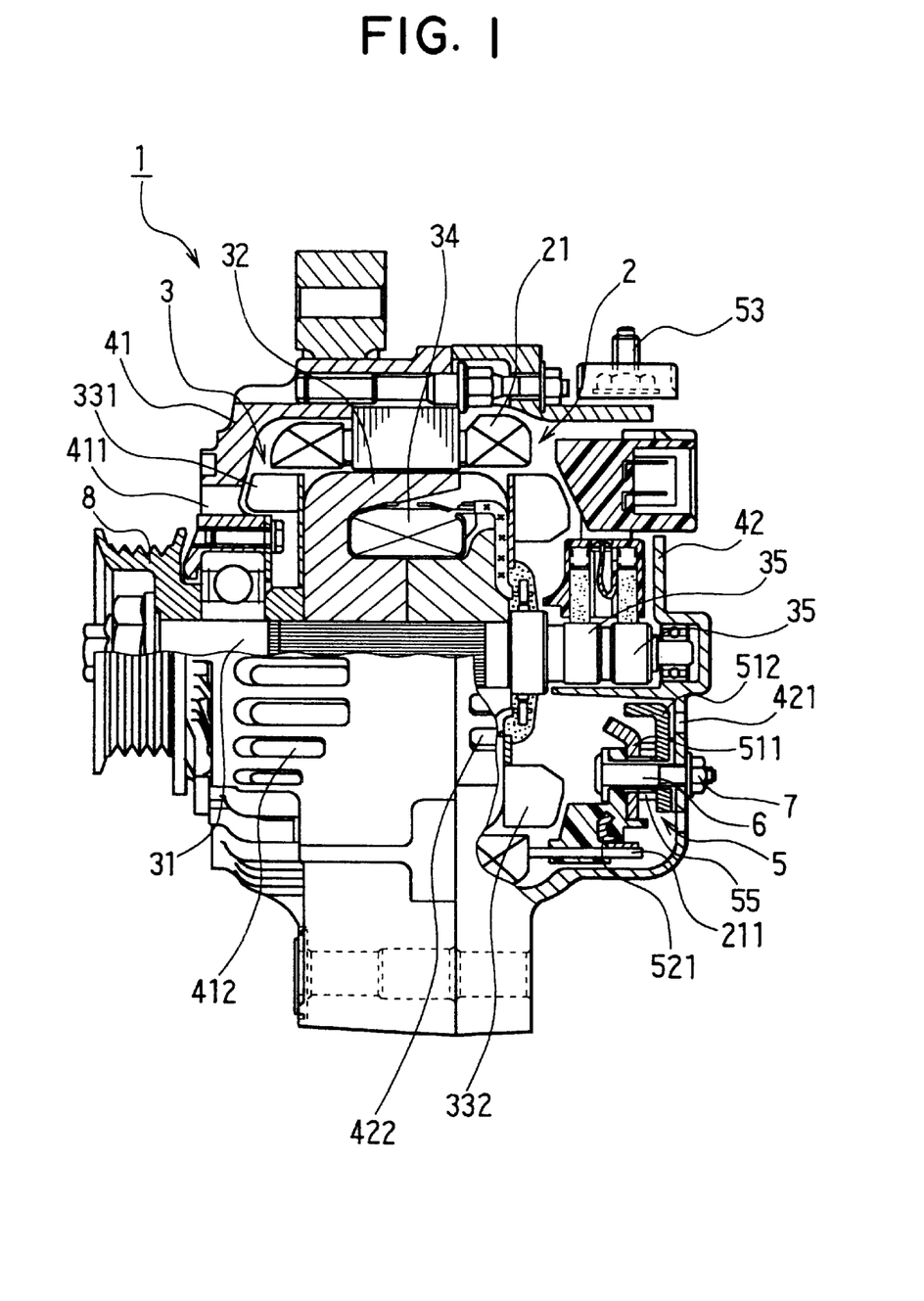
FIG. 1 is a partially cross-sectional side view of an AC generator for a vehicle according to a first embodiment of the invention.

As shown in FIG. 1, AC generator 1 is comprised of stator 2, rotor 3, a pair of front frame 41, and rear frame 42, and rectifier unit 5.

Stator 2 has a Y-connected stator winding 21, which is comprised of three phase-windings. Each phase winding has output lead wires 211 for an output terminal to be connected to rectifier unit. 5 and a neutral point. Rotor 3 is comprised of shaft 31, magnet core 32 having a plurality of claw poles, front cooling fan 331 and rear cooling fan 332 and cylindrically wound field coil 34, slip ring 35 and others. Rectifier unit 5 has four input terminals respectively connected to four output lead wires 211 of stator winding 21.

Shaft 31 carries pulley 8, which is driven by an engine mounted in a vehicle, and magnetic pole 32, which surrounds field coil 34 by the claw poles. Front and rear cooling fans 331, 332 are respectively welded to the front and rear surface of magnet pole 32 to generate cooling air when rotor 3 rotates.

Front and rear frames 41 and 42 respectively have air-intake windows 411 and 421 at opposite end surfaces thereof and air-discharge windows 412 and 422 at peripheral portions thereof.

Figure 2:
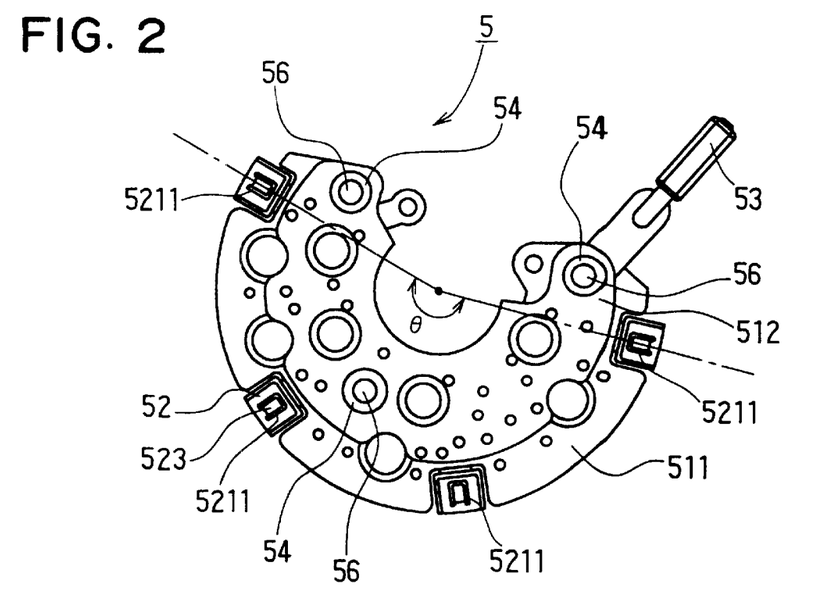
FIG. 2 is a front view of a rectifier unit of the AC generator according to the first embodiment.
Figure 3:
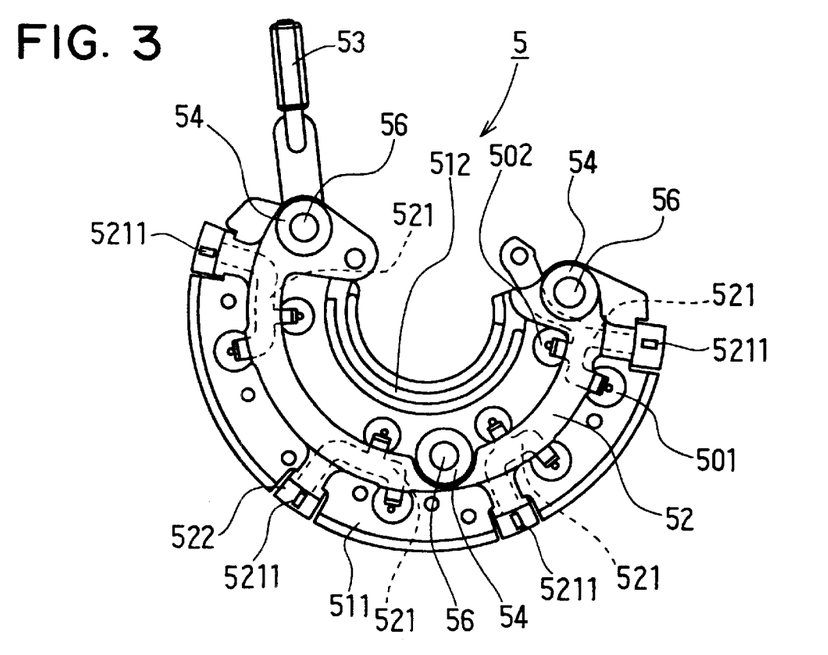
FIG. 3 is a rear view of the rectifier unit shown in FIG. 2.

As shown in FIGS. 2 and 3, rectifier unit 5 is comprised of terminal member 52, four positive diodes 501, four negative diodes 502, a pair of arc-shaped, positive copper heat sink 511 and negative copper heat sink 512, and DC output terminal 53. Positive diodes 501 are combined with positive heat sink 511 by welding, soldering, or press-fitting, and negative diodes 502 are combined with negative heat sink 512 in the manner stated above. DC output terminal 53 is fixed to positive heat sink 511. Positive heat sink 511 has circumferentially dispersed four recesses at the outer periphery thereof.

Figure 4:
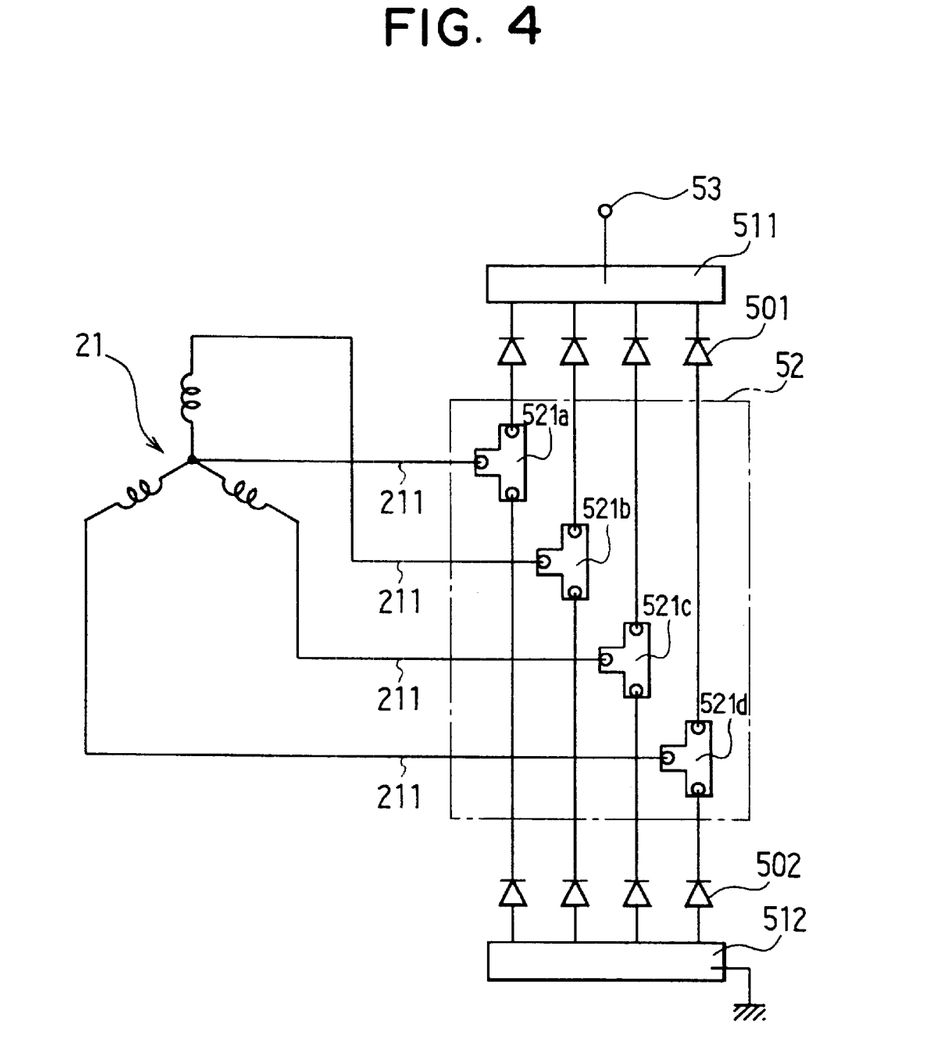
FIG. 4 is a schematic circuit diagram of the AC generator according to the first embodiment.

Terminal member 52 is a resin mold member having four insert metal terminals 521, which respectively connect the pairs of positive and negative diodes 501 and 502 to form a full-wave rectifying bridge circuit, as shown in FIG. 4.

Terminal member 52 and the pair of arc-shaped heat sinks 511 and 512 spans more than 180° in angle so that output lead wires 211 can support rectifier unit 5 more easily. Each of terminal member 52 and the pair of heat sinks 511 and 512 has three dispersed common through holes 56. Three insulation pipes 55 are disposed at the through holes between positive and negative heat sinks 511, 512, and pipe rivet 54 is inserted into each of insulation pipes 55 and each of through holes 56 to fix together.

The surface of terminal member 52 opposite rear cooling fan 332 has a fan-shroud portion providing a suitable gap between the surface and rear fan 332.

Figure 5:
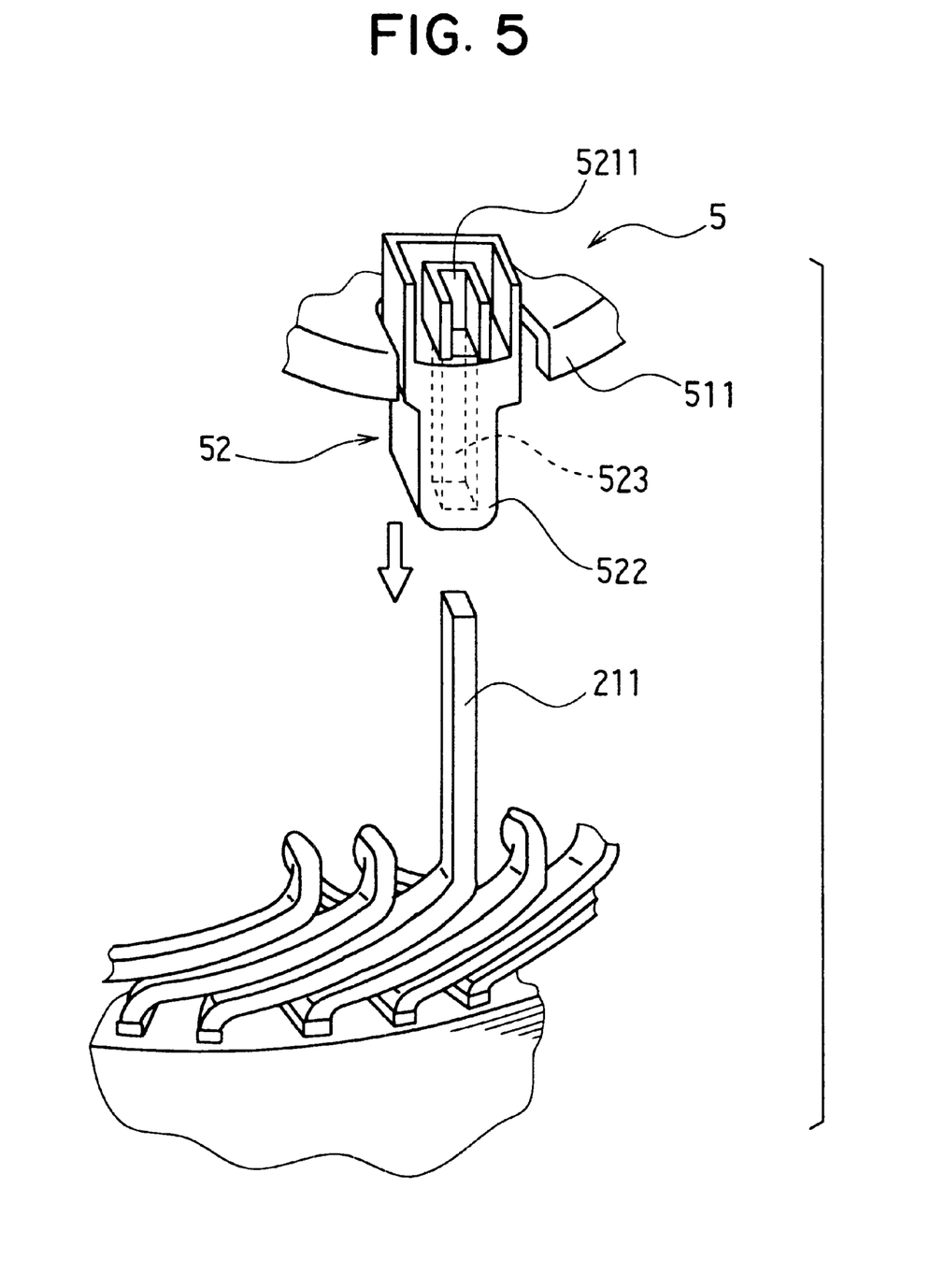
FIG. 5 is an exploded view illustrating a step of assembling the rectifier into a stator of the AC generator according to the first embodiment.
Figure 6:
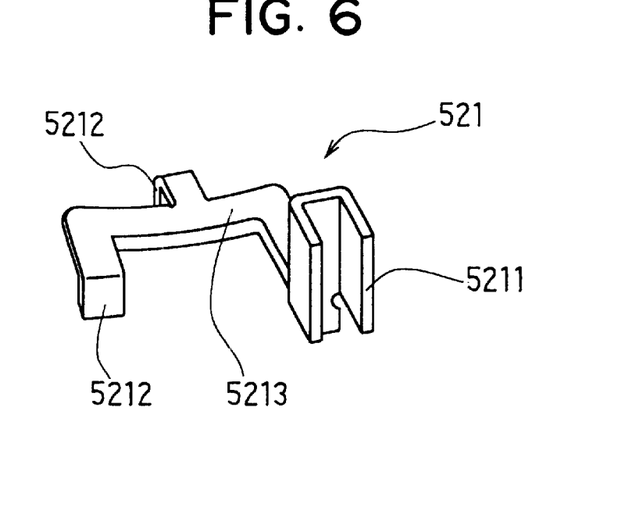
FIG. 6 is an insert metal terminal of a terminal member of the AC generator according to the first embodiment.

As shown in FIG. 5, each output lead wire 211 has a rectangular cross-section and extends from stator winding 21 so that the longer side of the cross section become parallel with the radial direction of stator 2. As shown in FIGS. 5 and 6, insert metal terminal 521 has U-shaped terminal portion 5211, a pair of L-bent terminal portions 5212 to be connected to positive and negative diodes, and connection portion 5213 which is insert-molded with resin. Terminal member 52 has four hollow axially extending guide portions 522 respectively disposed in the recess of positive heat sink 511. Each guide portion 522 has rectangular guide hole 523 formed under U-shaped terminal portion 5211 to which one of output lead wire 211 is inserted and welded or soldered to U-shaped terminal portion 5211 of insert metal terminal 521. This provides a sufficient stiffness to provisionally hold rectifier unit 5 after output lead wires 211 are welded to terminal member 52, while rectifier unit 5 is being fixed to, rear frame 42.

Figure 7:
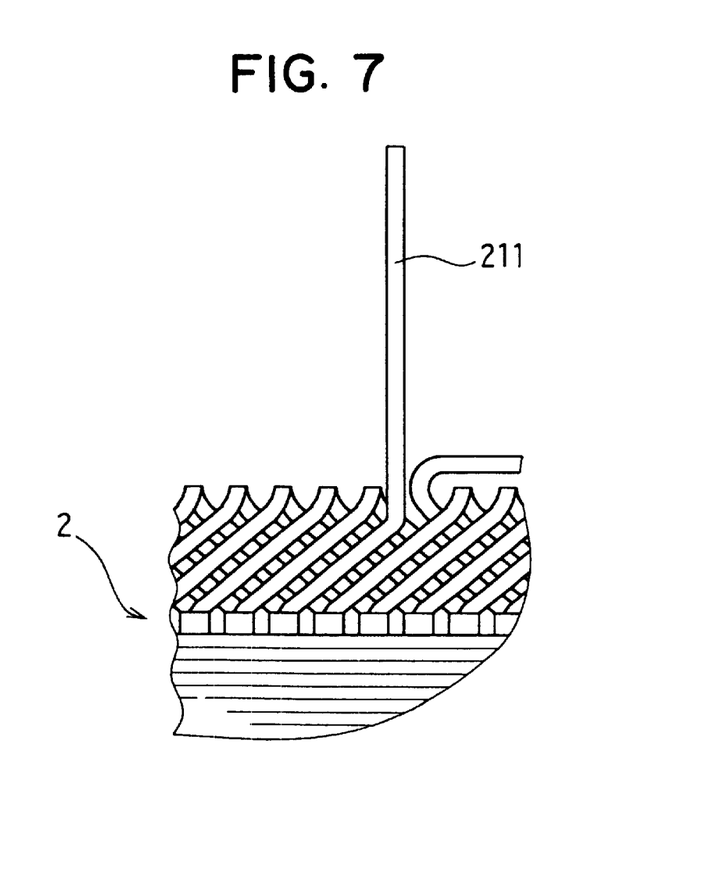
FIG. 7 is a fragmentary side view of the stator of the AC generator according to the first embodiment.

Guide holes 523 and U-shaped terminal portions 5211 of terminal member 52 are disposed separate from each other so that output lead wires 211 can be inserted into guide portions 522 easily from below, as illustrated in FIGS. 5 and 7. Then output lead wires 211 are guided to terminal portions 5211 to be welded together, and rectifier unit 5 is placed on frame 42. This structure provides a sufficient stiffness-to provisionally hold rectifier unit 5, so that rectifier unit 5 can be fixed to rear frame 42 by bolts 6, which are inserted into pipe rivets 54, and nuts 7.

(Second Embodiment)

Figure 8:
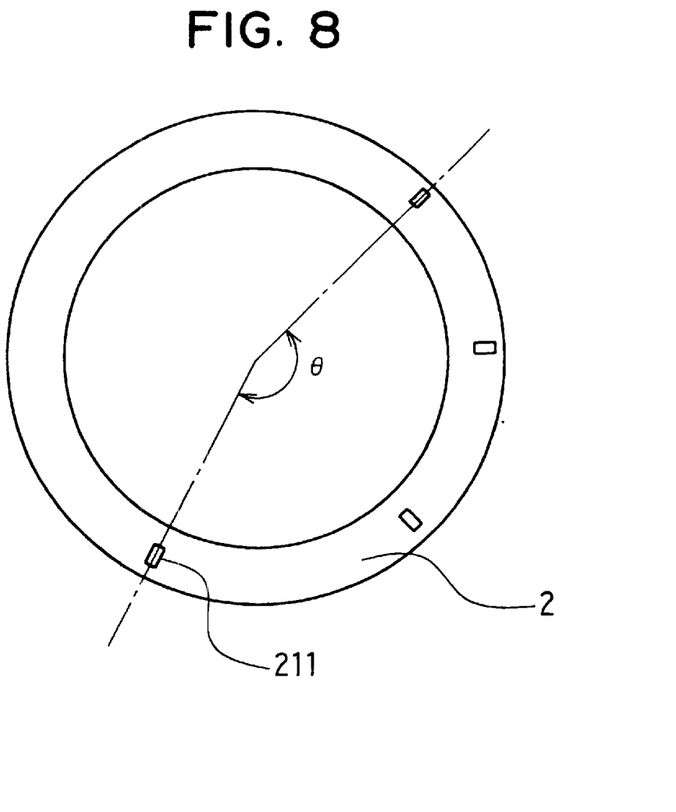
FIG. 8 is a schematic view illustrating location of output lead wires of an AC generator according to a second embodiment of the invention.
Figure 9:
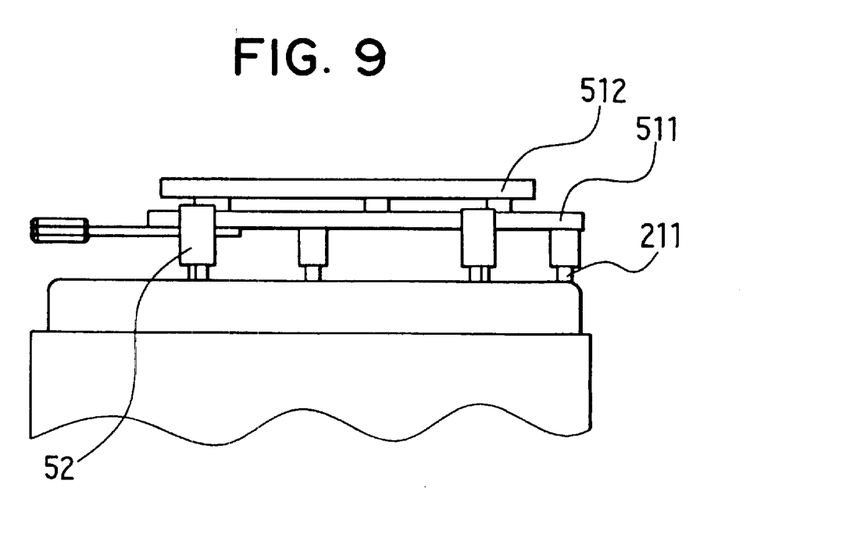
FIG. 9 is a schematic side view illustrating a rectifier unit being assembled into a stator of the AC generator according to the second embodiment.

U-shaped terminal portions 5211 of terminal member 52 can span in an arc range θ that is smaller than 180°, as shown in FIG. 8, if output lead wires 211 are stiff enough to support rectifier unit 5. Rectifier unit 5 is fixed to stator 2 as illustrated in FIG. 9.

(Third Embodiment)

Figure 10:
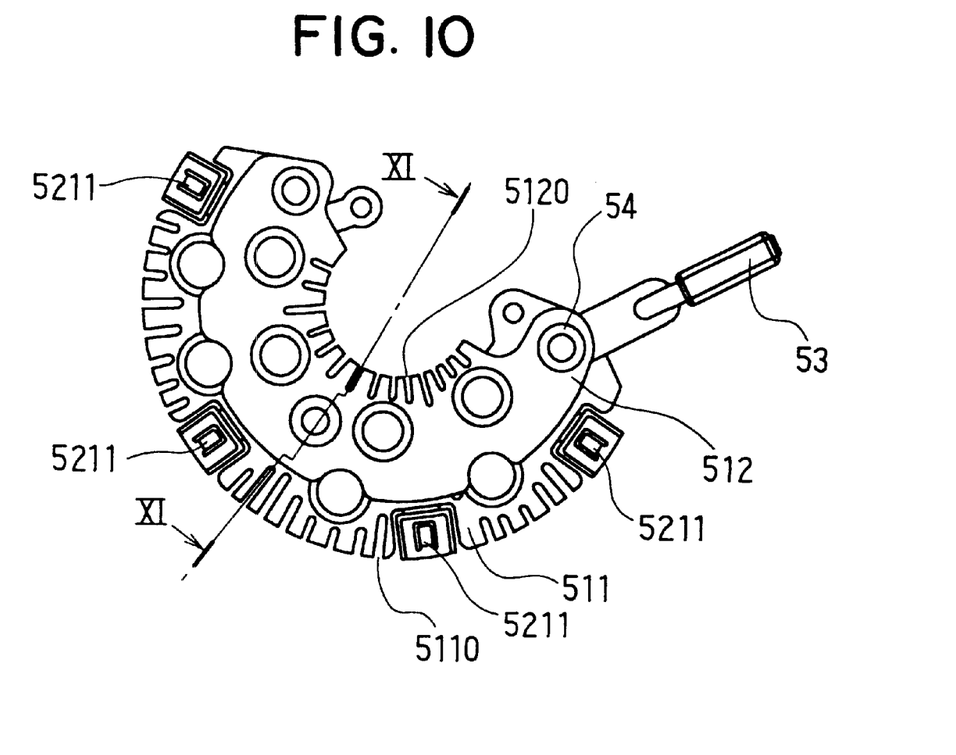
FIG. 10 is a rear view of a rectifier unit of an AC generator according to a third embodiment of the invention.
Figure 11:
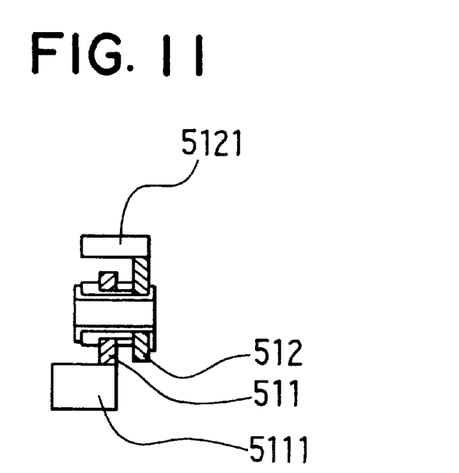
FIG. 11 is a cross-sectional side view of the rectifier unit cut along line XI—XI in FIG. 10.
Figure 12:
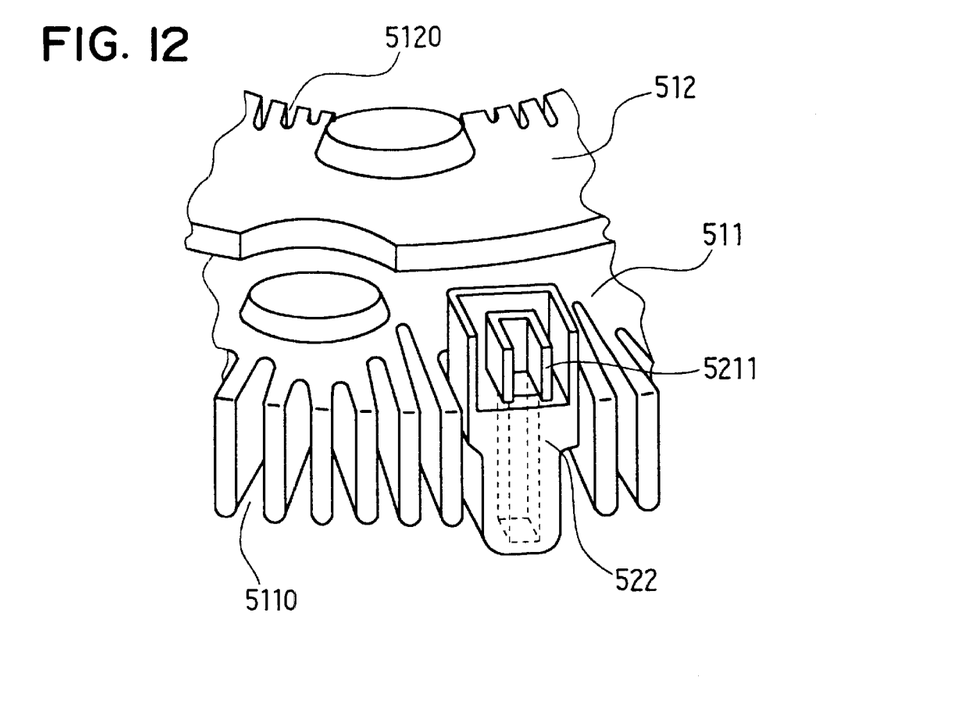
FIG. 12 is an enlarged perspective view illustrating a portion of the rectifier unit according to the third embodiment.

An AC generator according to a second embodiment of the invention is described with reference to FIGS. 10–12.

Aluminum heat sinks 511 and 512, which are lighter than the copper heat sinks of the first embodiment, are employed so that output lead wires.211 can support rectifier unit 5 more easily. A plurality of outer radial slits 5110 are formed along the outer periphery of positive heat sink 511, and a plurality of radial inner fins 5120 are also formed along the inner periphery of negative heat sink 512.

(Fourth Embodiment)

Figure 13:
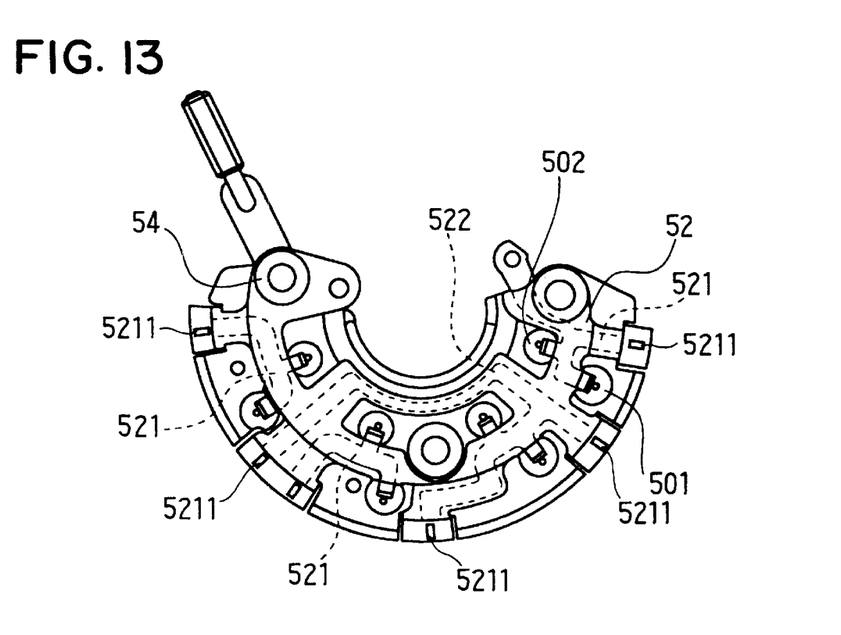
FIG. 13 is a rear view of a rectifier unit of an AC generator according to a fourth embodiment of the invention.
Figure 14:
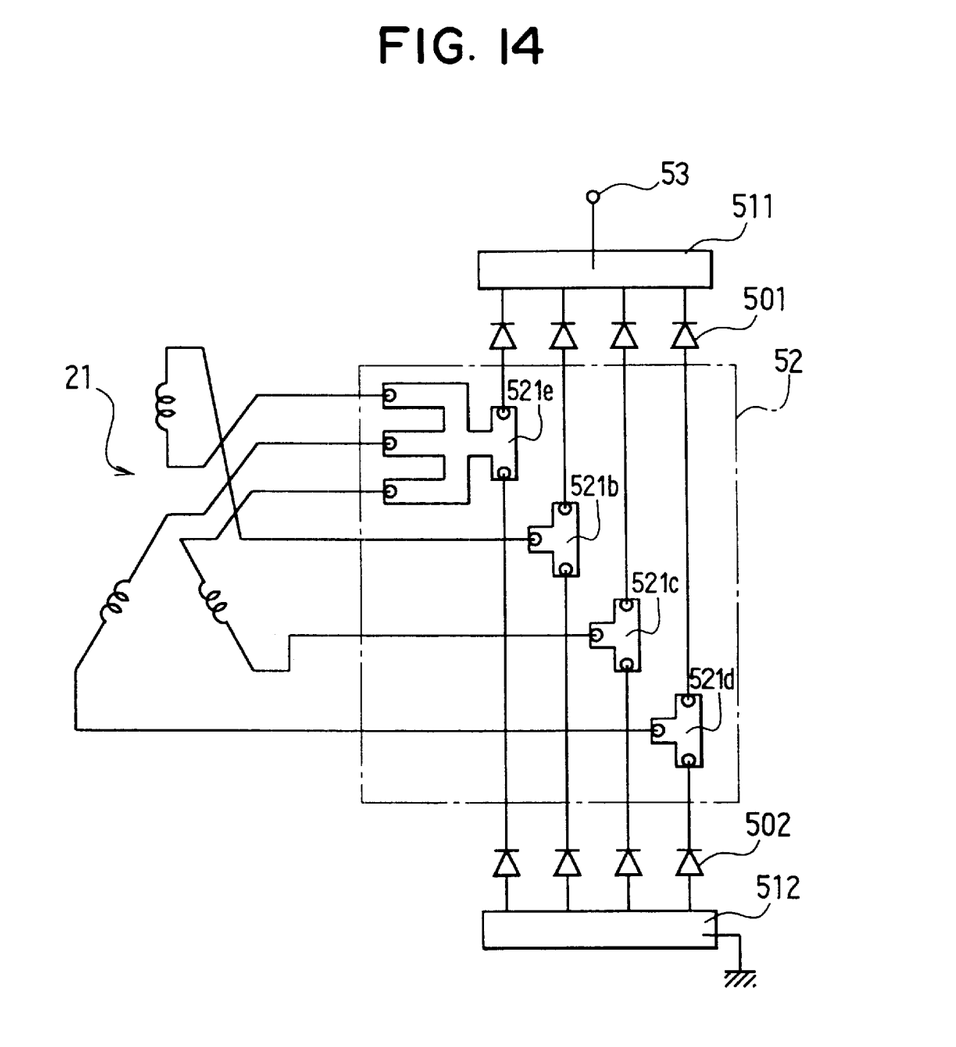
FIG. 14 is a schematic circuit diagram of the AC generator according to the fourth embodiment.

As shown in FIGS. 13 and 14, neutral point terminal 521e is substituted for metal terminal 521a of the first embodiment. Neutral point terminal 521e has three U-shaped terminal portions 5211 to which three output lead wires 211 for the neutral point are respectively connected. The three U-shaped terminal portions 5211 of neutral point terminal 522 are respectively located at the outer peripheral portions of positive heat sink 511 together with the other three U-shaped terminal portions 5211. This can reduce connection work time.

(Variations)

Figure 15:
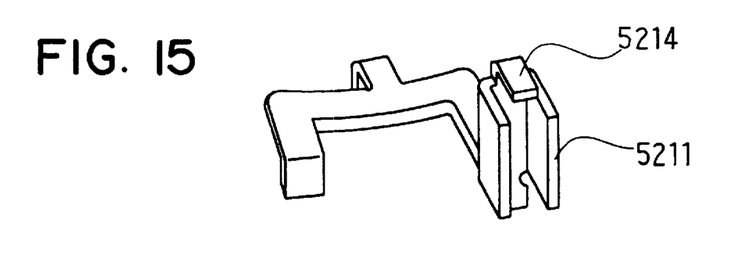
FIG. 15 is a perspective view of a variation of a insert metal terminal.
Figure 16:
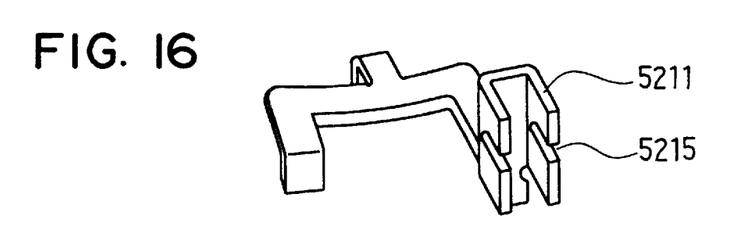
FIG. 16 is a perspective view of a variation of a insert metal terminal.

U-shaped terminal portions 5211 can have stopper 5214 to retain an end of output lead wire 211, as shown in FIG. 15, or intermediate slit 5215 so that output lead wire 211 can be clamped easily, as shown in FIG. 16.

Figure 17:
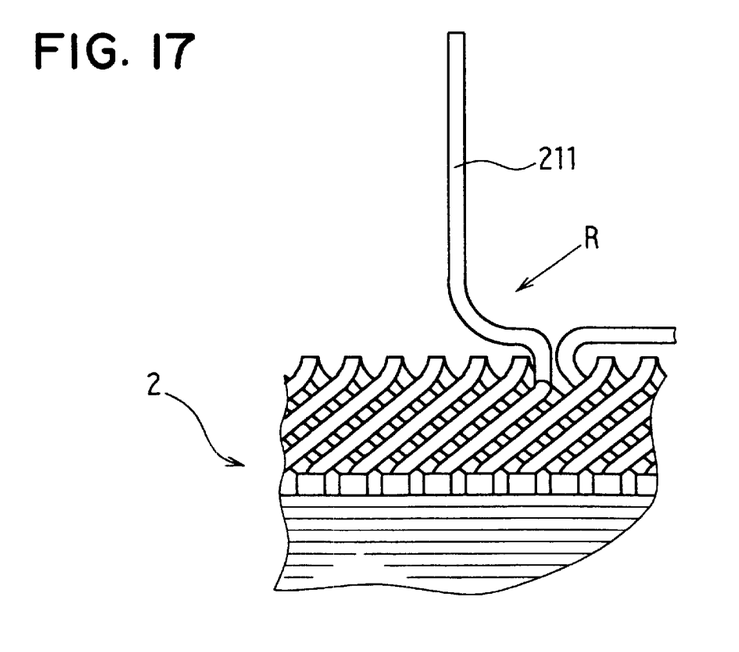
FIG. 17 is a fragmentary side view of a variation of the stator.

As shown in FIG. 17, output lead wire 211 can be bent to have a radius of curvature R to provide a degree of freedom of location of rectifier unit 5 to be connected to output lead wires 211.

Figure 18:
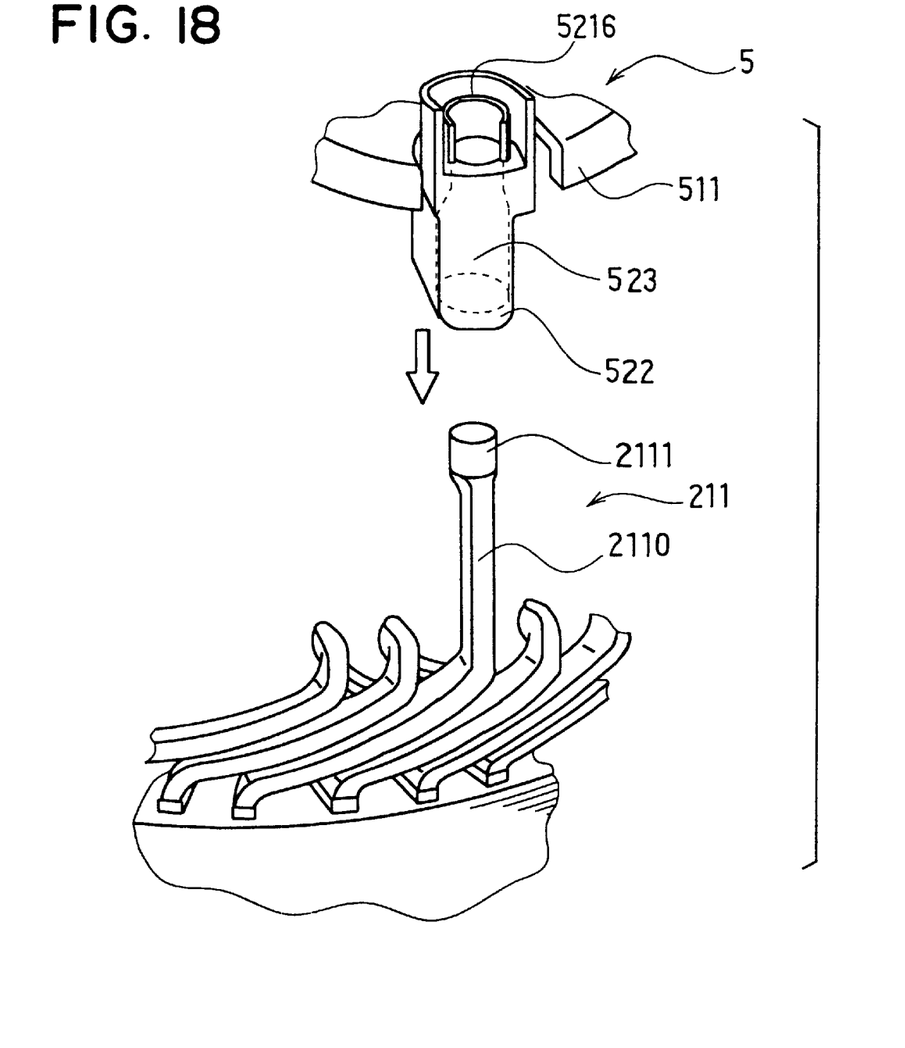
FIG. 18 is an exploded view illustrating a step of assembling the rectifier into a variation of the AC generator according to the first embodiment.
Figure 19:
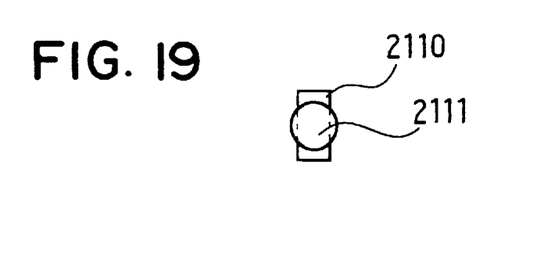
FIG. 19 is a schematic cross-sectional view of an output lead wire illustrated in FIG. 18.

As shown in FIGS. 18 and 19, end portion 2111 of rectangular output lead wire 211 is formed to be round in cross section to provide shoulder portion 2110, and circular metal terminal 5216 is substituted for U-shaped terminal portion 5211. Shoulder portion 2110 retains lead wires 211 as a stopper when output lead wire 211 is inserted into circular metal terminal 5216.

(Fifth Embodiment)

Figure 20:
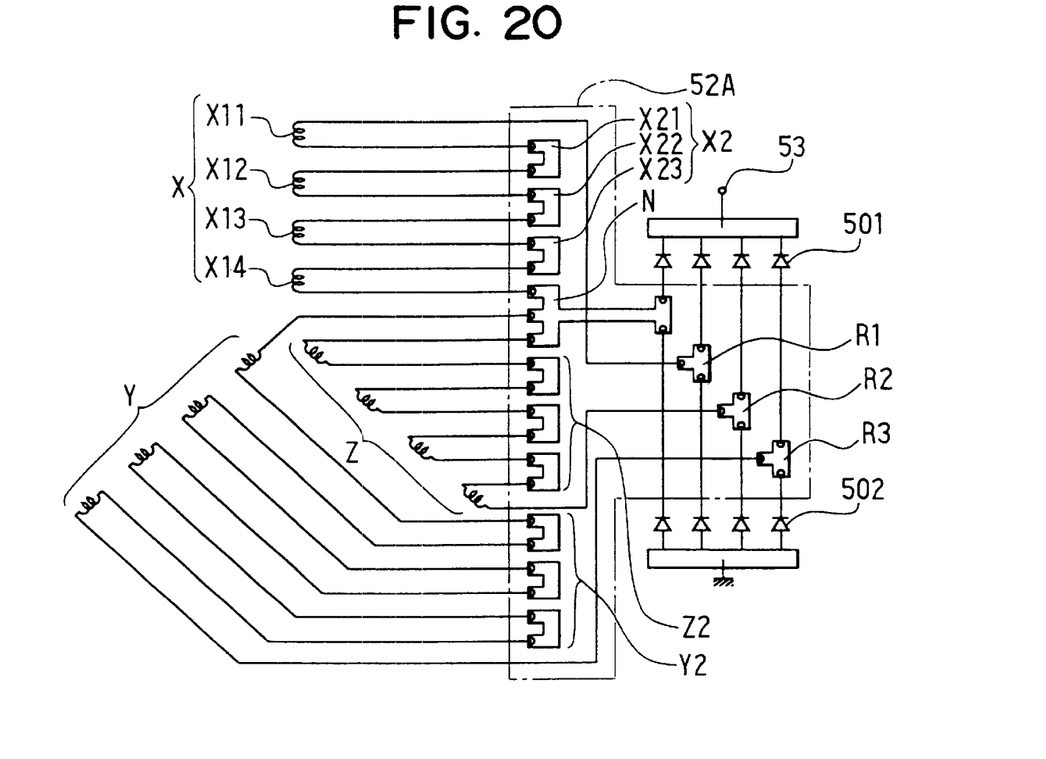
FIG. 20 is a schematic circuit diagram of an AC generator according to a fifth embodiment of the invention.

As illustrated in FIG. 20, stator winding 21 is comprised of three phase-windings X, Y, and Z, and each phase winding X, Y or Z is comprised of a plurality of lap-wound coils. For example X-phase-winding has coils X11, X12, X13, and X14, each of which is wound in slots of the stator 2 at one-pole pitch. Each coil is made of a rectangular wire or a wire having an elliptic cross-section. Each coil can be formed by a plurality of U-shaped segments or I-shaped segments welded to form a lap winding. Each coil has opposite ends, both, extending from one end of stator 2 in the axial direction thereof so that longer sides of the wire extend in the radial direction thereof, as illustrated in FIG. 5.

Generally circular terminal member 52A has three metal terminals R1, R2, and R3, one neutral point terminal N, and three connection groups X2, Y2, and Z2. Connection group X2 includes three X-phase connection members X21, X22, and X 23, which are disposed along the outer periphery of positive heat sink to respectively correspond to coils X11, X12, X13, and X14 to connect the four X phase coils in series to form X-phasewinding. Connection group Y2 includes three Y-phase connection members, which connect four Y-phase coils in series to form Y-phase-winding. connection group Z2 includes three Z-phase connection members, which connect four Z-phase coils to form Z-phase-winding. This makes connection works more suitable for automation.

Terminal member 52A can be formed into double circular members or a plurality of coaxially disposed arc members. For example, terminal member 52A can be comprised of a first member having the phase connection members and a second member having the neutral point terminal and the metal terminals. The first member can be disposed near the stator, in this case.

The connection members, neutral point terminal and metal terminals can be stamped out from a lead frame.

Output lead wires of the respective phase windings are star-connected in the similar manner as illustrated in FIG. 14. However, it is easy to connect the phase-windings in the delta-connection in a well-know manner.

(Variation)

Figure 21:
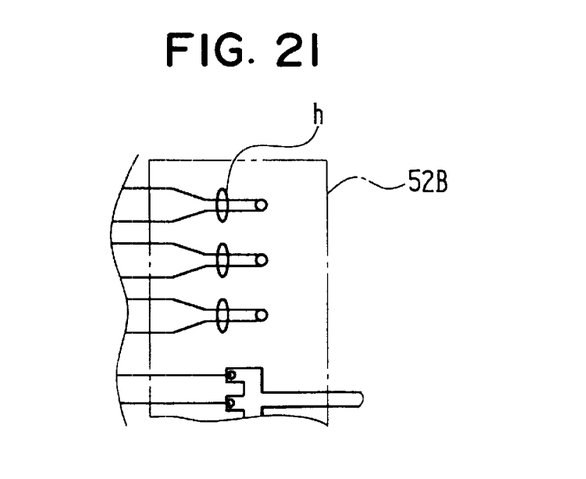
FIG. 21 is a schematic diagram illustrating a variation of a portion of the terminal member shown in FIG. 20.

The phase connection members (e.g. X21, X22, and X23) can be substituted by guide holes h formed in terminal member 52B, as illustrated in FIG. 21, In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for a vehicle, comprising:
   a rotor driven by an engine;
   a stator disposed around the rotor, the stator including a plurality of phase windings with a plurality of output lead wires extending in an axial direction of the rotor, the lead wires having a generally rectangular cross section with longer sides being parallel to a radial direction of the rotor;
   a pair of front and rear frames for supporting the rotor and the stator; and
   rectifier unit disposed between the pair of frames and connected to the plurality of output lead wires, the rectifier unit comprising:
      a pair of positive and negative metal heat sinks;
      a plurality of pairs of a positive rectifier element having one side combined with the positive heat sink and a negative rectifier element having one side combined with the negative heat sink; and
   a terminal member for respectively connecting the plurality of output lead wires and the positive and negative rectifier elements to form a bridge circuit, the terminal member having a plurality of metal terminals for connecting the other side of the positive and the negative rectifier elements, wherein the terminal member comprises a plurality of resin guide members having axially extending rectangular hole at the outer peripheral portion of the positive heat sink for guiding the lead wire therein, the metal terminals comprise U-shaped terminal portions, respectively disposed at the plurality of guide members, for connecting the lead wires, and each metal terminal comprises a stopper for retaining an end of the lead wire.

2. An AC generator for a vehicle comprising:
   a rotor driven by an engine;
   a stator disposed around the rotor, the stator including a plurality of phase windings with a plurality of output lead wires extending in an axial direction of the rotor, the lead wires having a generally rectangular cross section with longer sides being parallel to a radial direction of the rotor;
   a pair of front and rear frames for supporting the rotor and the stator; and
   a rectifier unit disposed between the pair of frames and connected to the plurality of output lead wires, the rectifier unit comprising:
   a pair of positive and negative metal heat sinks;
      plurality of pairs of a positive rectifier element having one side combined with the positive heat sink and a negative rectifier element having one side combined with the negative heat sink and
      terminal member for respectively connecting the plurality of output lead wires and the positive and negative rectifier elements to form a bridge circuit, the terminal member having a plurality of metal terminals for connecting the other side of the positive and the negative rectifier elements, wherein the pair of positive and negative heat sinks comprises a pair of arc-shaped aluminum alloy members having a plurality of recesses at circumference of the pair of positive and negative heat sinks, the metal terminals comprise U-shaped terminal portions respectively disposed in the plurality of recesses and, each metal terminal comprises a stopper for retaining an end of the lead wire.

* * * * *